US012469282B2

(12) United States Patent
Yan

(10) Patent No.: US 12,469,282 B2
(45) Date of Patent: Nov. 11, 2025

(54) SYSTEMS AND METHODS FOR RETRIEVING VIDEOS USING NATURAL LANGUAGE DESCRIPTION

(71) Applicant: HUAWEI TECHNOLOGIES CO., LTD., Shenzhen (CN)

(72) Inventor: Ning Yan, Milpitas, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 18/071,523

(22) Filed: Nov. 29, 2022

(65) Prior Publication Data

US 2023/0086735 A1 Mar. 23, 2023

Related U.S. Application Data

(63) Continuation of application No. PCT/US2020/053802, filed on Oct. 1, 2020.
(Continued)

(51) Int. Cl.
*G06K 9/00* (2022.01)
*G06F 16/735* (2019.01)
(Continued)

(52) U.S. Cl.
CPC ............ *G06V 20/41* (2022.01); *G06F 16/735* (2019.01); *G06F 16/738* (2019.01);
(Continued)

(58) Field of Classification Search
CPC ...... G06V 20/41; G06V 10/86; G06V 10/426; G06V 20/46; G06V 20/48; G06V 30/1988;
(Continued)

(56) References Cited

U.S. PATENT DOCUMENTS 8,364,660 B2 * 1/2013 Delgo .................. G11B 27/034
707/706
10,671,851 B2 * 6/2020 Cheng .................... G06V 20/70
(Continued)

OTHER PUBLICATIONS

International Search Report and Written Opinion dated Jan. 15, 2021, International Application No. PCT/US2020/053802.
(Continued)

*Primary Examiner* — Shervin K Nakhjavan

(57) ABSTRACT

Implementations are directed to methods, systems, and computer-readable media for obtaining videos and extracting, from each video, a key frame for the video including a timestamp. For each key frame, a scene graph is generated. Generating the scene graph for the key frame includes identifying, objects in the image, and extracting a relationship feature defining a relationship between a first object and a second, different object of the objects in the key frame. The scene graph for the key frame is generated that includes a set of nodes and a set of edges. A natural language query request for a video is received, including terms defining a relationship between two or more particular objects. A query graph is generated for the natural language query request, and a set of videos corresponding to the set of scene graphs matching the query graph are provided for display on a user device.

18 Claims, 9 Drawing Sheets

Related U.S. Application Data

(60) Provisional application No. 63/032,571, filed on May 30, 2020.

(51) Int. Cl.
  *G06F 16/738* (2019.01)
  *G06F 16/783* (2019.01)
  *G06F 40/279* (2020.01)
  *G06V 10/86* (2022.01)
  *G06V 20/40* (2022.01)
  *G06V 10/426* (2022.01)
  *G06V 30/196* (2022.01)

(52) U.S. Cl.
  CPC ........ *G06F 16/7837* (2019.01); *G06F 40/279* (2020.01); *G06V 10/86* (2022.01); *G06V 10/426* (2022.01); *G06V 20/46* (2022.01); *G06V 20/48* (2022.01); *G06V 30/1988* (2022.01)

(58) Field of Classification Search
  CPC .. G06F 16/735; G06F 16/738; G06F 16/7837; G06F 40/279; G06F 16/71
  See application file for complete search history.

(56) References Cited

U.S. PATENT DOCUMENTS

| | | | |
|---|---|---|---|
| 10,909,401 B2* | 2/2021 | Burachas | G06T 7/11 |
| 11,210,523 B2* | 12/2021 | Geng | G06V 10/764 |
| 11,442,986 B2* | 9/2022 | Gan | G06N 3/049 |
| 11,500,927 B2* | 11/2022 | Jindal | G06F 16/7867 |
| 2006/0036564 A1 | 2/2006 | Yan et al. | |
| 2010/0070483 A1 | 3/2010 | Delgo et al. | |
| 2017/0177715 A1 | 6/2017 | Chang et al. | |
| 2019/0304157 A1* | 10/2019 | Amer | G06V 40/23 |
| 2019/0370587 A1 | 12/2019 | Burachas et al. | |
| 2024/0281462 A1* | 8/2024 | Saggi | G06V 20/47 |

OTHER PUBLICATIONS

Yasin Danish et al, "Semantic Video Retrieval using Deep Learning Techniques", 2020 17th International Bhurban Conference on Applied Sciences and Technology (IBCAST), IEEE, Jan. 14, 2020, total 6 pages, XP033745308.

Podlesnaya Anna et al, "Deep Learning Based Semantic Video Indexing and Retrieval", arXiv.org, Jan. 28, 2016, total 9 pages, XP093088514.

Extended European Search Report dated Oct. 31, 2023, European Patent Application No. 20855811.4, 10 pages.

* cited by examiner

SYSTEMS AND METHODS FOR RETRIEVING VIDEOS USING NATURAL LANGUAGE DESCRIPTION

CLAIM OF PRIORITY

This application is a continuation of, and claims priority to, PCT Patent Application No. PCT/US2020/053802, entitled "SYSTEMS AND METHODS FOR RETRIEVING VIDEOS USING NATURAL LANGUAGE DESCRIPTION", filed Oct. 1, 2020, which claims priority to U.S. Provisional Patent Application No. 63/032,571, entitled "SYSTEM AND METHOD FOR RETRIEVING VIDEOS USING NATURAL LANGUAGE DESCRIPTION OF VISUAL RELATIONSHIP ON SMARTPHONE", filed May 30, 2020, which applications are incorporated by reference herein in their entirety.

FIELD

This specification generally relates to video processing and searching for videos in a video gallery.

BACKGROUND

Searching for particular videos within video galleries containing large numbers of videos can be time consuming and can result in search results containing videos that are unresponsive or irrelevant to a search query submitted by a user.

SUMMARY

Implementations of the present disclosure are generally directed to video/image processing and video gallery queries. More particularly, implementations of the present disclosure are directed to utilizing a machine-learned model to process a repository of videos to extract, from each video, a set of key frames representative of the videos. The machine-learned model is further utilized to process the key frames to extract objects and relationship features defining relationships between the objects in each key frame. The extracted objects and relationship features are used to build a scene graph for each of the key frames, where objects form the nodes and relationship features form the edges between nodes. A searchable index of scene graphs for the key frames can be generated from the scene graphs. A query for a video can be provided by a user via a client device, where the query includes a natural language description of a visual relationship between objects included in a video of interest. A query graph can be generated from the query, where the query graph can be matched to one or more scene graphs in the searchable index of scene graphs. Videos including key frames corresponding to the one or more matching scene graphs can be provided in response to the query for the video.

In some implementations, operations can include generating, for videos, scene graphs. Generating the scene graphs can include extracting, from each video of the videos, key frames, each key frame including a timestamp corresponding to an occurrence of the key frame within the video and a reference to the video including the key frame, and generating, for each key frame in the plurality of key frames, a scene graph for the key frame. Generating the scene graph for the key frame includes identifying, by a machine-learned model, objects in the key frame, extracting, by the machine-learned model, a relationship feature defining a relationship between a first object and a second, different object of the objects in the key frame, and generating, by the machine-learned model and from the first object, the second object, and the relationship feature, the scene graph for the key frame that includes a set of nodes and a set of edges that interconnect a subset of nodes in the set of nodes, where the first object is represented by a first node from the set of nodes, the second object is represented by a second node from the set of nodes, and the relationship feature is an edge connecting the first node to the second node. The methods may further include receiving a natural language query request for a video in the videos, where the natural language query request includes terms specifying two or more particular objects and a relationship between the two or more particular objects, generating a query graph for the natural language query request, identifying, from the scene graphs, a set of scene graphs of the scene graphs matching the query graph, determining, from the identified set of scene graphs, a set of videos of the plurality of videos, each video including at least one scene graph of the set of scene graphs, and providing, for display on a client device, the set of videos.

Other implementations of this aspect include corresponding systems, apparatus, and computer programs, configured to perform the actions of the methods, encoded on computer storage devices.

These and other implementations can each optionally include one or more of the following features. In some implementations, the methods can further include providing, for display on the client device, a set of key frames corresponding to the set of scene graphs of the scene graphs matching the query graph.

In some implementations, the methods can further include ranking the set of videos of the videos, the ranking including: determining, for each video of the set of videos, a relevance score based on a number of key frames of the set of key frames that include the reference to the video, and ranking the set of videos according to respective relevance scores.

In some implementations, the natural language query request can be for a key frame within a particular video and specifies the two or more particular objects and the relationship between the two or more particular objects in the key frame.

In some implementations, the methods can further include generating, from the scene graphs, a scene graph index, where identifying the set of scene graphs of the scene graphs matching the query graph includes searching the scene graph index.

In some implementations, identifying the objects in the key frame can include extracting, by the machine-learned model, a set of bounding boxes, each bounding box encompassing an object in the key frame, and identifying, by the machine-learned model, the object within the bounding box.

The present disclosure also provides non-transitory computer-readable media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a non-transitory computer-readable media device coupled to the one or more processors having instructions stored thereon which, when executed by the one or more processors, cause the one or more processors to perform operations in accordance with implementations of the methods provided herein.

Particular embodiments of the subject matter described in this specification can be implemented so as to realize one or more of the following advantages. For example, an advantage of this technology is that it can facilitate efficient and accurate discovery of videos and key frames within videos using natural language descriptions of visual relationships between objects depicted in the key frames, and may reduce a number of queries required to be entered by a user in order to find a particular video of interest. This in turn reduces the number of computer resources required to execute multiple queries until the appropriate video has been identified.

The system can provide a more intuitive interface for end users to find videos of interest and/or particular frames within videos of interest by using natural language and visual relationship descriptions to search through scene graphs generated from key frames that are representative of the videos. Searching through an index of scene graphs can accelerate a querying process, where the query can be performed over the scene graphs generated from the key frames rather than iterating through frames of the videos, thus reducing the need to iterate and/or search through the videos. Deep neural networks and a machine-learned model can be utilized to map key frames into scene graphs that represent underlying visual relationships. The machine-learned model can be pre-trained using a repository of training videos/images and can be further refined for a particular video gallery of a user to increase accuracy of the identified visual relationships and the corresponding scene graphs.

The technology described in this specification can also provide an accurate yet resource-efficient technique for generating scene graphs from frames in a video. For example, in some implementations, the techniques described in this specification extract a subset of the frames from the video, referred to in this specification as key frames, that substantively represent the content in the video (i.e., the content in the remaining frames of the video). For example, a particular frame in the video may have few, if any, differences relative to a group of subsequently-occurring frames in the video. This particular frame can be a key frame because its content is representative of the group of subsequently-occurring frames. The techniques described in this specification achieve resource efficiencies because they generate scene graphs only for the key frames of the video, as opposed to generating scene graphs for each frame in the video, which can be a significantly resource-intensive computing task. Moreover, the resulting scene graphs of the key frames accurately capture/represent the expected scene graphs for every frame of the video.

The system can be used to facilitate discovery of videos from various sources, e.g., videos taken by a user, generated videos, downloaded videos, or the like, as well as videos stored in various locations, e.g., on local storage of a user device or a cloud-based server.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Overview

Figure 1:
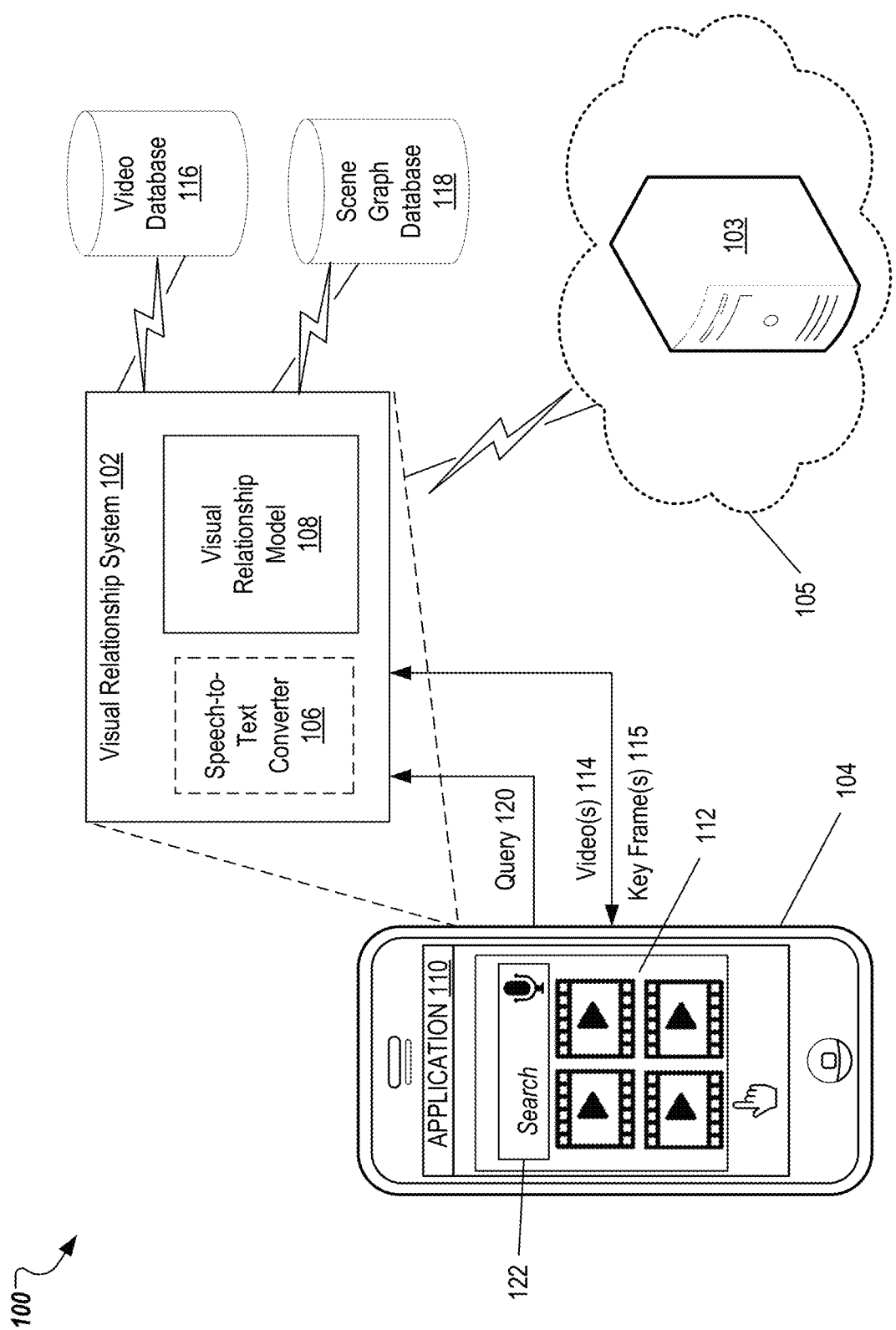
FIG. 1 depicts an example operating environment of a visual relationship system.

Implementations of the present disclosure are generally directed to video/image processing and video gallery queries. More particularly, implementations of the present disclosure are directed to utilizing a machine-learned model to process a repository of videos in order to extract, from each video, key frames that are representative of the video. For each key frame, objects and relationship features defining relationships between the objects are extracted. The extracted objects and relationship features are used to build a scene graph for each of the key frames, where objects form the nodes and relationship features form the edges between nodes. A searchable index of scene graphs can be generated for the key frames extracted from the repository of videos. Each scene graph includes a timestamp corresponding to an occurrence of the respective key frame in a video and a reference to the video containing the key frame. A query for a video can be provided by a user, where the query includes a natural language description of a visual relationship between objects included in a video of interest. A query graph can be generated from the query, where the query graph can be matched to one or more scene graphs in the searchable index of scene graphs. Videos including key frames corresponding to the one or more matching scene graphs can be provided in response to the query for the video.

A natural language query including multiple terms that are descriptive of a visual relationship between objects can be provided by a user. Queries can be provided as text queries or voice queries, e.g., through an assistant application on a user device, in which case speech-to-text processing and natural language processing can be applied to the query. A query graph can be generated from the multiple terms of the query, and such a query graph identifies objects and relationship features between the identified objects, as defined by the terms of the query.

A search of the index of scene graphs to find matches between the query graph and scene graphs can be performed. As part of this matching, a confidence score between each matched scene graph and the query graph can be assigned and utilized to rank the matched scene graphs. A set of key frames corresponding to the matched scene graphs and respective videos including one or more of the set of key frames can be provided in response to the query, e.g., for display on a user device.

In some implementations, an artificial intelligence (AI)-enabled processor chip can be enabled with natural language understanding and integrated with a processor, e.g., a central processing unit (CPU) or a graphics processing unit (GPU), in a "smart" mobile device. The AI-enabled processor chip enabled with natural language understanding can be utilized to receive a natural language voice query and generate, from the natural language voice query, a query graph for the voice query. The AI-chip can be used to accelerate object detection and relationship feature extraction using pre-trained machine-learned models stored locally on the user device and/or on a cloud-based server. In some implementations, the AI-chip can be utilized, e.g., using key frame extraction algorithms, to perform a portion of video post-processing of the videos.

Example Operating Environment

FIG. 1 depicts an example operating environment 100 of a visual relationship system 102. Visual relationship system 102 can be hosted on a local device, e.g., user device 104, one or more local servers, a cloud-based service, or a combination thereof. In some implementations, a portion or all of the processes described herein can be hosted on a cloud-based server 103.

Visual relationship system 102 can be in data communication with a network 105, where the network 105 can be configured to enable exchange of electronic communication between devices connected to the network 105. In some implementations, visual relationship system 102 is hosted on a cloud-based server 103 where user device 104 can communicate with the visual relationship system 102 via the network 105.

The network 105 may include, for example, one or more of the Internet, Wide Area Networks (WANs), Local Area Networks (LANs), analog or digital wired and wireless telephone networks e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. The network may include multiple networks or subnetworks, each of which may include, for example, a wired or wireless data pathway. The network may include a circuit-switched network, a packet-switched data network, or any other network able to carry electronic communications e.g., data or voice communications. For example, the network may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network may include one or more networks that include wireless data channels and wireless voice channels. The network may be a wireless network, a broadband network, or a combination of networks including a wireless network and a broadband network. In some implementations, the network 105 can be accessed over a wired and/or a wireless communications link. For example, mobile computing devices, such as smartphones, can utilize a cellular network to access the network 105.

User device 104 can host and display an application 110 including an application environment. For example, a user device 104 is a mobile device that hosts one or more native applications, e.g., application 110, that includes an application interface 112, e.g., a graphical user interface, through which a user may interact with the visual relationship system 102. User device 104 include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In addition to performing functions related to the visual relationship system 102, the user device 104 may also perform other unrelated functions, such as placing personal telephone calls, playing music, playing video, displaying pictures, browsing the Internet, maintaining an electronic calendar, etc.

Application 110 refers to a software/firmware program running on the corresponding mobile device that enables the user interface and features described throughout, and is a system through which the visual relationship system 102 may communicate with the user on user device 104. The user device 104 may load or install the application 110 based on data received over a network or data received from local media. The application 110 runs on mobile devices platforms. The user device 104 may receive the data from the visual relationship system 102 through the network 105 and/or the user device 104 may host a portion or all of the visual relationship system 102 on the user device 104.

The visual relationship system 102 includes a speech-to-text converter 106 and visual relationship model 108. Though described herein with reference to a speech-to-text converter 106 and visual relationship model 108, the operations described can be performed by more or fewer sub-components. Visual relationship model 108 can be a machine-learned model and can be built using multiple sub-models each implementing machine learning to perform the operations described herein. Further detail of the visual relationship model 108 is described with reference to FIGS. 2A, 3, and 4A-B.

Visual relationship system 102 can obtain, as input, video 114 from a video database 116 including a repository of videos 114. Video database 116 can be locally stored on user device 104 and/or stored on cloud-based server 103, where the visual relationship system 102 may access video database 116 via network 105. Video database 116 can include, for example, a user's collection of videos captured using a camera on a mobile phone. As another example, video database 116 can include a collection of videos captured by multiple user devices and stored in a remote location, e.g., a cloud server.

The visual relationship system 102 can generate, using the visual relationship model 108, scene graphs for a scene graph database 118 as output. Scene graph database 118 can be locally stored on user device 104 and/or stored on cloud-based server 103, where the visual relationship system 102 may access the scene graph database 118 via network 105. Scene graph database 118 can include scene graphs generated for at least a subset of the videos 114 in the video database 116. Further details of the generation of scene graphs are described with reference to FIG. 2A.

Visual relationship system 102 can receive, from a user on user device 104, a query 120 through application interface 112 as input. Query 120 can be a voice query provided by a user of user device 104 through the application interface 112. Query 120 can be a text-based query entered by a user into application interface 112.

Application interface 112 can include a search feature 122 where a user can select to enter a query 120, e.g., a voice query. In one example, a user can enter a voice query using an assistant function of the user device 104, which can be activated, e.g., by pressing the microphone button 124 in search feature 122. In another example, a user can enter a text query in the text field of the search feature 122.

Query 120 can be a natural language query including terms descriptive of a visual relationship between objects that may be included in one or more videos 114. A natural language query can include terms that are part of a user's normal vocabulary and not include any special syntax or formatting. The natural language query can be entered in various forms, for example, as a statement, a question, or a simple list of keywords. In one example, a natural language query is "I want to find a boy holding a ball." In another example, a natural language query is "Where is the video of a dog running on the beach?" In yet another example, a natural language query is "Boy holding ball. Boy on beach."

The speech-to-text converter 106 can receive the user's voice query and parse the user's voice query into text using voice-to-text techniques and natural language processing. The parsed query can be provided by the speech-to-text converter 106 to the visual relationship model 108 as input.

In response to user-input query 120, the visual relationship system 102 can provide one or more videos 114 responsive to the query 120 as output to the user device 104, for display in the application interface 112 of the application 110.

In some implementations, a user can select to enter a query 120, e.g., a text-based query. For example, a user can type a textual query into search feature 122. Query 120 can be a natural language query including terms descriptive of a visual relationship depicted in one or more videos 114. The visual relationship model 108 can receive the textual query as input and utilize natural language processing, e.g., as a function of the AI-based chip, to parse the textual query. In response to the user-input query 120, the visual relationship system 102 can provide one or more videos 114 responsive to the query 120 as output to the user device 104, for display in the application interface 112 of the application 110.

In some implementations, a preview frame is displayed for each video 114 in the application interface 112 of the application 110. The preview frame can be, for example, a key frame 115 of the video 114. Further details of the processes of the visual relationship system 102 are described with reference to FIGS. 2A and 3.

Figure 2A:
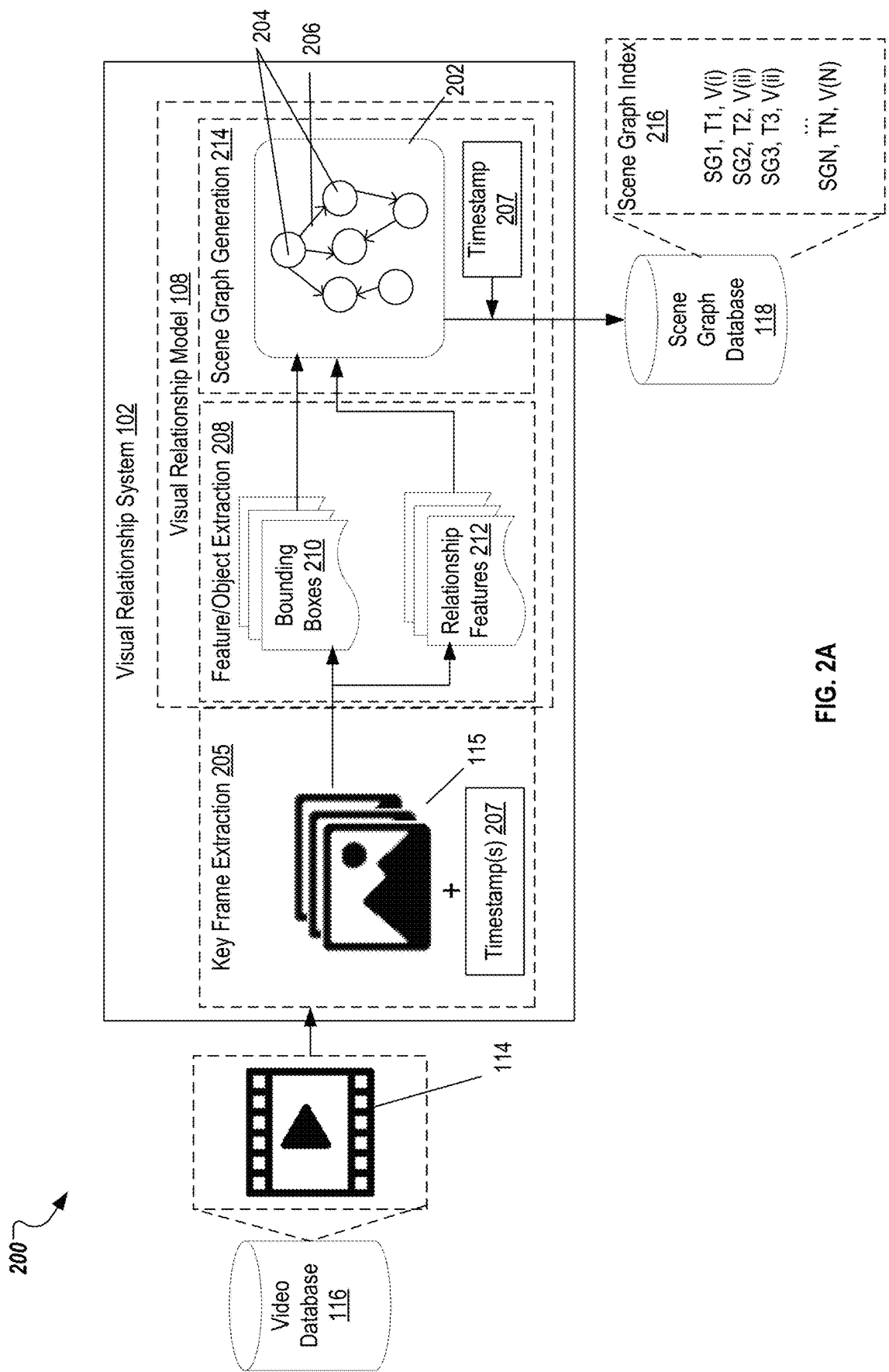
FIG. 2A depicts a block diagram of an example embodiment of the visual relationship system.

FIG. 2A depicts a block diagram 200 of an example embodiment of the visual relationship system 102, and in particular the visual relationship model 108, that generates scene graphs from key frames 115 extracted from input videos 114. As depicted in FIG. 2A, and as briefly described with reference to FIG. 1, visual relationship model 108, which is part of the visual relationship system 108, can obtain videos 114 from video database 116 as input.

The visual relationship model 108 can be a machine-learned model which may be in turn built utilizing multiple sub-models to perform the actions described herein. Visual relationship model 108 can include deep neural network model(s) where key frames 115 from respective videos 114 in the video database 116 are mapped into scene graphs 202 representing the underlying visual relationships. An example architecture for the visual relationship model 108 is described with reference to FIG. 2B below, however, the actions performed by the visual relationship model 108 can be implemented generally to perform the actions described with reference to key frame extraction 205, feature/object extraction 208, and scene graph generation 214.

The visual relationship model 108 generates a respective scene graph 202 for one or more key frames 115 extracted from each video 114 and provides the generated scene graphs for storage in a scene graph database 118. In some implementations, a scene graph 202 is generated for a key frame of each of a subset of the videos 114 in the video database 116, e.g., a subset of the total number of videos in the video database 116.

A scene graph 202 includes a set of nodes 204 and a set of edges 206 that interconnect a subset of nodes in the set of nodes. Each scene graph 202 can define a set of objects that are represented by respective nodes 204, e.g., where a first object is represented by a first node from the set of nodes, and a second object is represented by a second node from the set of nodes. The first node and the second node can be connected by an edge representing a relationship feature that is defining of a relationship between the two objects.

The visual relationship model 108 can be implemented using one or more deep neural networks. In some implementations, visual relationship model 108 includes machine learning models that are based on one or more pre-trained models which can be trained using generic data, e.g., a generic video repository, or user-specific data, e.g., a user's video library, to generate a scene graph for each key frame 115 of a respective video 114 into the model. The visual relationship model 108 can be trained using supervised training to generate scene graphs from key frames. The pre-trained models can then be further fine-tuned based on a video database 116, e.g., a user's collection of videos. The fine-tuning process can be conducted either on the user device 104 and/or on a cloud-based server 103 depending on, for example, a location of the videos 114, and the processing capacity of the user device 104. Thus, in some implementations, the initial training can be performed by a machine learning model that is stored in the cloud-based server 103, or another networked location, and then, after completion of training, can be provided for storage and further fine tuning to a user device 104. Alternatively, the initial training and any subsequent fine tuning may be performed on the user device 104. Alternatively, the initial training and any subsequent fine tuning may be performed on the cloud-based server 103, or another networked location.

In some implementations, after the visual relationship has been initially trained and/or fine-tuned, the visual relationship model 108 can process an obtained video 114 to extract a set of key frames 115 and, for each key frame 115, perform feature/object extraction 208, which in turn can be used to generate a scene graph for the key frame 115. In one example, a user's video gallery on a mobile device or a cloud-based video gallery including a set of videos can be analyzed by the visual relationship model 108 to extract a set of key frames 115. For the set of key frames 115, a respective set of scene graphs 202 can be generated that are descriptive of the visual relationships within the key frames 115 for each of the corresponding videos 114.

The visual relationship model 108 can obtain a video 114 and perform key frame extraction 205 on the video 114 to extract one or more key frames 115. Each key frame 115 includes a frame of video 114 representative of the video 114 and a timestamp 207 corresponding to an appearance of the key frame in the video 114.

The visual relationship model 108 can determine that the key frames 115 are relevant frames and representative of the video semantics of the video 114. Determination of a relevance of one or more frames can include utilizing histogram-based key frame extraction techniques by comparing differences between two consecutive frames. In another example, boundary coefficient-based key frame extraction techniques can be utilized to determine a relevance of one or more frames as key frames that are representative of the video 114.

In some implementations, other metrics can be utilized to determine the key frames 115 for a video 114. User-defined metrics, e.g., an occurrence of a particular person or object, in the video can be used to define the key frames 115. Facial recognition and/or object recognition techniques can be utilized to identify frames within the video 114 including the particular person and/or object. For example, a user may indicate, e.g., through application interface 112, that frames including the user are significant. The visual relationship system 102 can utilize this indicated preference to identify key frames 115 in videos 114 as frames including the user.

In some implementations, determining key frames 115 in a video can include dividing the video 114 into subsections, e.g., 30 second clips of video, and then selecting a representative frame of each subsection to be the key frame 115. Further discussion of key frame extraction is discussed with reference to FIG. 4A below. A key frame 115 extracted from the video 114 can be associated with a timestamp 207, e.g., a relative time of occurrence of the key frame 115 with respect to the video 114. The timestamp 207 can be associated with the key frame 115 in an index/table, where the timestamp 207 is stored with the key frame 115 in the index/table. The timestamp 207 can be a label assigned to the key frame 115, e.g., in metadata for the key frame 115. For example, a key frame 115 can be associated with timestamp 207 of 0:00:27, where the key frame 115 appears at the 27$^{th}$ second from the start of the video 114. In some implementations, a key frame 115 can be associated with a timestamp 207 that indicates a frame number of a total number of frames of the video 114, for example, 127/400, where the key frame 115 appears at the 127$^{th}$ frame of a total of 400 frames of the video 114. Other similar timestamps can be associated with each key frame 115.

Key frame 115 can include a reference to the video 114 from which the key frame 115 is extracted. A reference to the video 114 can include, for example, an identifier label or another form of unique identification for the video, e.g., video_example1.mp4. In another example, the reference can include a storage location for the video, e.g., on the user device 104 or on cloud-based server 103. Additionally, the key frame can be associated with a timestamp 207 that marks its occurrence position in a set of frames for the video 114. The timestamp 207 can be stored together with the generated scene graph for the key frame 115 and can be returned responsive to the query with the set of videos, such that a user may select a timestamp 207 for a particular video including the key frame 115 stored with the timestamp 207 in order to advance video playback to the location of the key frame 115.

The extracted key frames 115 can be processed by a machine-learned model, e.g., visual relationship model 108, to extract objects and relationship features descriptive of relationships between the objects and generate a respective scene graph representative of each extracted key frame 115.

The visual relationship model 108 can obtain a video 114, e.g., from a user's video gallery, and perform feature/object extraction 208 on the key frame 115. In one example, a user's video gallery on a mobile device or a cloud-based video gallery including a set of videos can be analyzed by the visual relationship model 108 to generate respective scene graphs 202 for key frames 115 corresponding to respective videos 114 and that are descriptive of the visual relationships within the videos 114. The generated scene graphs 202 can be stored in a searchable scene graph database 118.

Feature/object extraction 208 can include identifying, by the visual relationship model 108, objects in the key frame 115. Identifying objects in the key frame 115 can include applying bounding boxes 210 to the key frame 115, where each bounding box 210 encompasses an object appearing in the key frame 115. For example, multiple bounding boxes 210 can be applied to a key frame 115 that depicts a boy holding a ball, where a first bounding box can encompass the boy and a second bounding box can encompass the ball. Partial objects can appear in key frame 115, e.g., a portion of a ball, where a bounding box can be applied to the portion of the object appearing in the key frame 115. Identifying objects in the key frame 115 can be performed using object detection models, for example Mask R-CNN or YOLO. In some embodiments, identifying objects in the key frame 115 can be performed using a machine-learned model architecture that can perform object detection and scene graph prediction/generation in a concurrent process. For example, a feature pyramid network (FPN) can be utilized to aggregate multi-scale information that is derived from a ResNet50 backbone that is applied to an input key frame 115.

Feature/object extraction 208 can additionally include extracting, by the visual relationship model 108, relationship features 212 defining relationships between objects of the multiple objects in the key frame 115. In some implementations, each relationship feature 212 defines a relationship between a first object and a second, different object. For example, a relationship feature 212 can be "holding," where the relationship feature 212 defines a relationship between a first object "boy" and a second object "ball," to define a visual relationship of "boy" "holding" "ball." Relationships can be determined by the visual relationship model 108, for example, based in part on proximity/spatial distances between objects, known relationships between categories of objects, user-defined relationships between particular objects and/or categories of objects, or the like. In some implementations, a machine-learned model can be utilized to predict the relationship between detected object pairs. The model may be a single-pass model that completes both object detection and relationship identification a same time. In other words, feature/object extraction to identify objects and define relationships between objects can be performed using a one-pass model where the machine-learned model completes both an object detection process and a relationship identification inference process in a single pass.

Figure 2B:
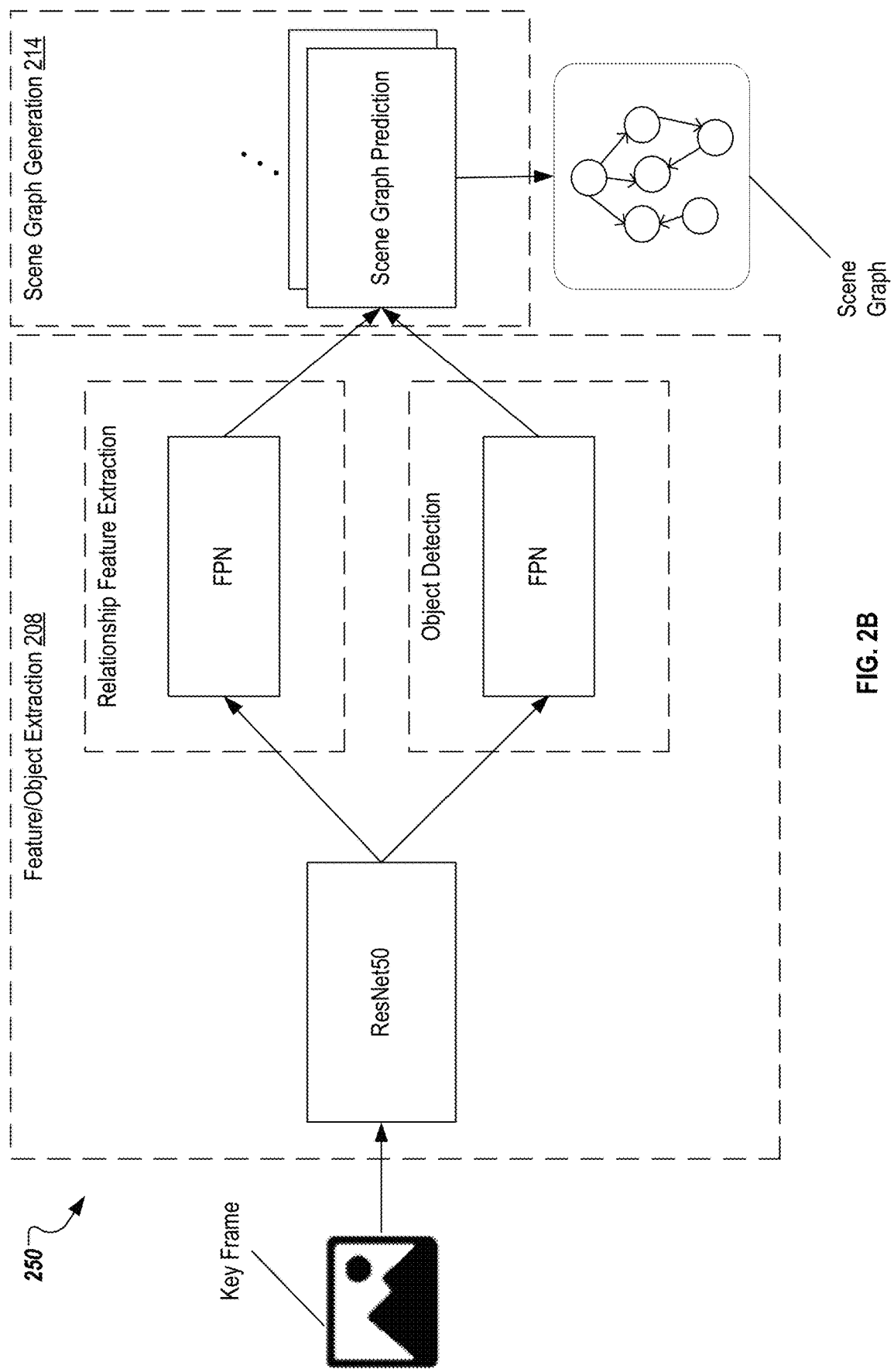
FIG. 2B depicts a block diagram of an example architecture of the visual relationship model.

In some implementations, the visual relationship model 108 is a machine-learned model implemented as a single pass model, which can predict a scene graph for an input video 114 and/or input key frame 115 in a single pass. An example architecture 250 for a machine-learned single-pass model is depicted in FIG. 2B.

As depicted in the architecture 250, a dual-branch technique can be utilized to perform object detection and relationship feature extraction, e.g., as described with reference to the feature/object extraction 208. Architecture 250 can include Resnet50, HRNet, or another similar convolutional neural network to obtain a key frame 115 from a video 114 and generate a multiple scale output representing features extracted/generated from multiple scaling of an original output, e.g., 256×256, 128×128, 64×64, etc. The multiple scale output can be provided as input to a feature pyramid network (FPN)-style structure for processing the multiple scale output. In the example depicted in FIG. 2B, two FPN (each individually referred to as FPN or a BiFPN) can be used to each perform object detection and relationship feature extraction respectively, e.g., as described with reference to feature/object extraction 208, however, more or fewer FPN can be utilized in the architecture 250. The multiple output relationship prediction tensors of each BiFPN can be utilized as input for multiple convolution and batch normalization layers for predicting the scene graph for the input image. The output of the architecture 250 includes a scene graph, e.g., scene graph 202 generate from input key frame 114.

Visual relationship model 108 predicts, from the extracted objects from bounding boxes 210 and relationship features 212, a scene graph, via scene graph generation 214. A scene graph 202 for each key frame 115 representative of a video 114 is generated from the objects and relationship features for the key frame 115, where each object is a node 204 and each relationship feature is an edge 206 connecting at least two nodes 204 together. The scene graph 202 can include each identified object as a node and relationship features between at least two objects as an edge connecting the nodes. A first node can be connected to multiple other different nodes, where each connection is an edge defining a relationship feature between the first node and a second different node of the multiple other nodes. For example, a first node can be "boy," a second node can be "ball," and a third node "hat." The first node and second node can be connected by an edge representing relationship feature "holding," e.g., "boy holding ball," and the first node and third node can be connected by an edge representing relationship feature "wearing," e.g., "boy wearing hat."

In some implementations, a first node may be connected to multiple other different nodes by a same type of relationship feature, where each connection is represented by a separate edge. For example, a boy can be holding a ball and a book in a key frame 115. A first node can be "boy" and a second node can be "ball" and a third node can be "book." The relationship feature can be "holding" between the first and second nodes, e.g., "boy holding ball," and can also be "holding" between the first and third nodes, e.g., "boy holding book." The scene graph 202 can include the three nodes, e.g., "boy" "ball" "book", and the two edges, e.g., "holding" and "holding".

The scene graph 202 for the key frame 115 is stored in scene graph database 118, and includes a reference to the video 114 and a timestamp 207 referencing an occurrence of the key frame 115 with respect to the video 114. A scene graph index 216 can be built from the stored scene graphs 202 in the scene graph database 118, which may facilitate matching stored scene graphs 202 to queries using graph indexing techniques. As one example, the scene graph index can be a lookup table that identifies each key frame and its corresponding scene graph and timestamp, as depicted in FIG. 2A.

Various graph indexing techniques can be utilized, for example, Graph Indexing: A Frequent Structure-based Approach (gIndex). More generally, graph indexing techniques based on paths and/or techniques based on structures can be utilized. Reverse indexing techniques may be utilized for scene graph indexing, depending in part on a size of the scene graphs that are generated.

Referring back to FIG. 1, a user can provide a query 120 to the visual relationship system 102, e.g., as a voice query or a text query, via application interface 112. Visual relationship system 102 can process the voice query 120 using a speech-to-text converter 106 and provide a parsed query to the visual relationship model 108. In some implementations, speech-to-text converter 106 can transcribe a voice query 120 into textual commands using voice-to-text neural network models, e.g., ALBERT, or another similar neural network model.

Figure 3:
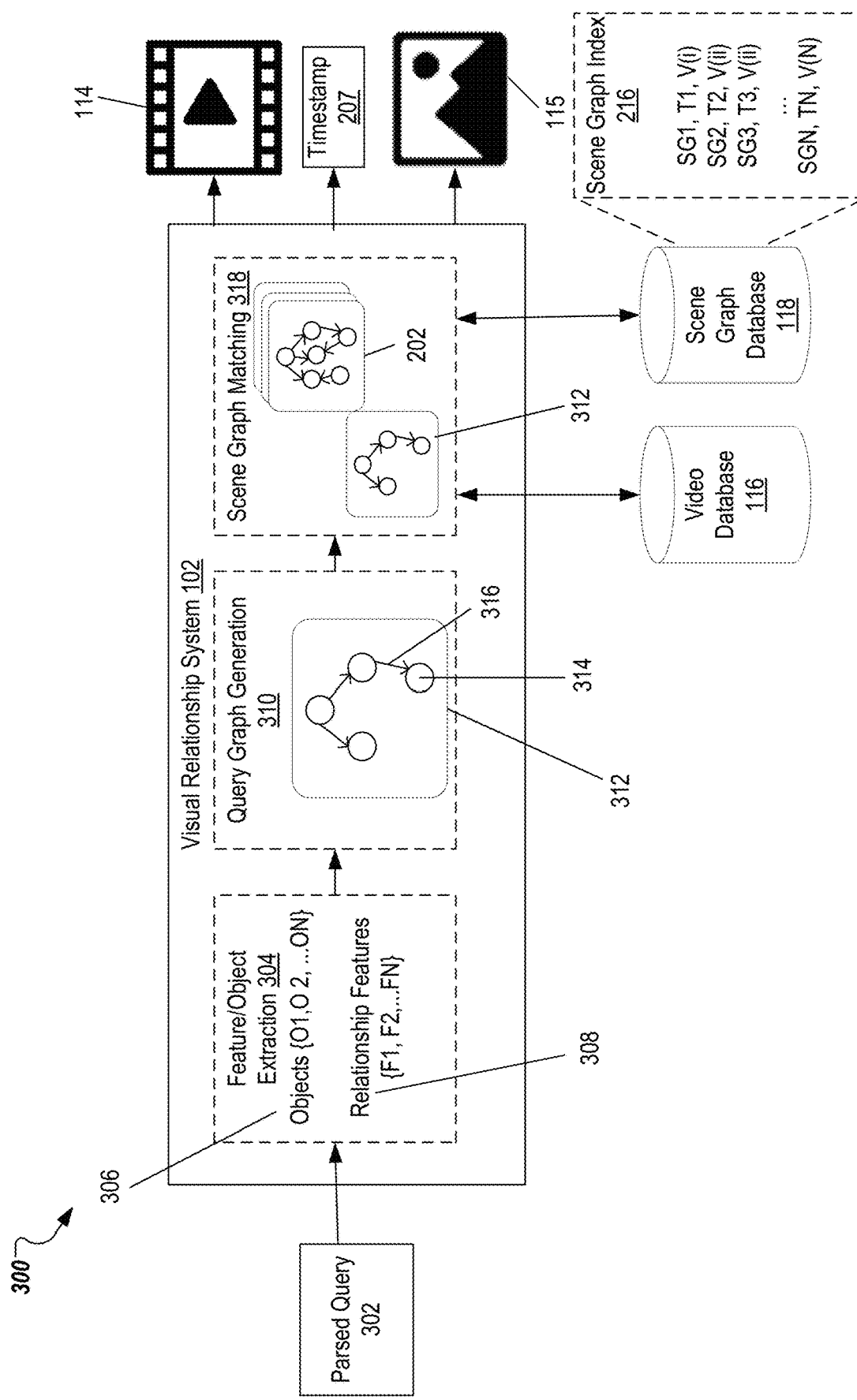
FIG. 3 depicts a block diagram of another example embodiment of the visual relationship system.

FIG. 3 depicts a block diagram 300 of another example embodiment of the visual relationship system, where the visual relationship model 108 is utilized to discover scene graphs matching a user input query.

A query 302 including terms descriptive of a visual relationship can be provided to the visual relationship system 102. In some implementations, query 302 is a textual query that is generated by the speech-to-text converter 106 from a query 120 received by the visual relationship system 102 from a user on a user device 104.

Visual relationship system 102 can receive the query 302 as input and perform feature/object extraction 304 on the query 302 to determine terms of the query 302 defining objects 306 and relationship features 308. Visual relationship system 102 can extract objects 306 and relationship features 308 from the input query 302, for example, by using natural language processing to parse the terms of the query and identify objects/relationship features. In one example, natural language processing techniques, e.g., the Python Spacy toolkit, can be used to process the query to extract objects and relationships. In one example, a query 302 is "I want a boy holding a ball" where the object-terms are determined as "boy" and "ball" and relationship feature-terms are determined as "holding."

The visual relationship system 102 can utilize the extracted objects 306 and relationship features 308 that are defined in the terms of the query 302 to perform query graph generation 310. A query graph 312 can be generated where objects 306 and relationship features 308 extracted from the terms of the query 302 are utilized as nodes 314 and edges 316 between nodes, respectively. Continuing the example provided above, a query graph 312 can include a first node "boy" and a second node "ball" with an edge "holding" connecting the first and second nodes 314.

The visual relationship system 102 can perform scene graph matching 318 between query graph 312 and scene graphs 202 from scene graph database 118. In some implementations, the matching, which is further described below, between query graph 312 and scene graphs 202 from scene graph database 118 includes searching a scene graph index 216 to retrieve key frames 115 corresponding relevant videos 114 that are responsive to query 120. A set of scene graphs 202 that match the query graph 312 are selected from the scene graphs 202 in the scene graph database 118. The query graph 312 can be matched with indexes in the scene graph database 118 for retrieving relevant videos 114 and key frames 115 including respective timestamps 207 associated with the key frames 115 as query results.

In some implementations, visual relationship system 102 can utilize one or more relevance models to perform the scene graph matching 318. Scene graphs 202 can be assigned confidence scores, where scene graphs 202 meeting a threshold confidence score to the query graph 312 can be identified. The set of identified scene graphs 202 meeting the threshold confidence score can be ranked, where a first scene graph 202 and the query 312 having a higher confidence score, e.g., a closer match, can be ranked higher than a second scene graph 202 having a lower confidence score, e.g., a more distant match. Scene graph matching can be exact matching of words, e.g., where a same set of a first node and a second node are connected by a same edge in both the scene graph and the query graph. For example, a scene graph can include a "boy-holding-ball" node1-edge-node2 relationship and the query graph can also include the "boy-holding-ball" relationship. Scene graph matching can alternatively be proximate matching or fuzzy matching, for example, where one or more of the nodes or one or more of the edges between nodes are different between the scene graph and the query graph. Proximate matching can be matching of words based on a semantic distance of the words based on word embedding, e.g., using word2vec or the like. For example, a query graph can include "boy-holding-ball" and an identified scene graph can include "boy-throwing-ball," where "holding" and "throwing" are determined, e.g., by a pre-generated lexicon, to be within a threshold of matching.

In some implementations, the set of identified scene graphs 202 can be clustered such that scene graphs 202 corresponding to key frames 115 representative of a same video 114 form a cluster. Each cluster of identified scene graphs can be ranked with respect to each other cluster of identified scene graphs 202. In one example, a first cluster including a first number of identified scene graphs can be assigned a higher ranking than a second cluster including a second number of identified scene graphs when the first number is greater than the second number.

In some implementations, a first video 114 referenced by a first cluster of identified scene graphs 202 can be ranked higher than a second video 114 referenced by a second cluster of identified scene graphs or a single identified scene graph 202, where the second cluster includes fewer scene graphs than the first cluster.

Videos 114 corresponding to the set of identified scene graphs 202 can be provided for display on the user device, e.g., in application interface 112. The videos 114 including key frames 115 corresponding to the set of identified scene graphs 202 can be displayed according to a ranking, where a video 114 including a key frame 115 corresponding to a scene graph 202 with a higher confidence score can be presented at a more prominent location, e.g., at the top of a display, than a video 114 including a key frame 115 corresponding to a scene graph 202 with a lower confidence score.

In some implementations, a set of top-ranked videos 114 are provided for display on the user device, e.g., a set of the top 10 ranked videos 114. A user can provide feedback to the visual relationship system 102 to request a range of videos 114 to provide in response to a query request, e.g., between 0-25 videos. In one example, a user may request up to 15 videos to be returned in response to a query request. In some implementations, a number of videos returned for display on the user device can depend on a pre-defined parameter, e.g., set by the application 110. The number of videos displayed may depend on a device screen size, where the number of videos is set by the available display space for thumbnail previews of the videos.

In some implementations, key frames 115 are provided for display on the user device, e.g., in application interface 112. Each key frame 115 provided for display can include a timestamp 207 referencing an appearance of the key frame 115 in a respective video 114. A key frame 115 may be selectable by a user to begin playback of the video 114 at the occurrence of the key frame 115 within the video 114. In this manner, the techniques described in this specification enable a user to immediately navigate to the relevant portion of the video that is responsive to the user's query, as opposed to presenting a long video to the user where the user has to manually scan the video, and thus utilize additional computing resources, to access the relevant portion of the video.

Figure 4A:
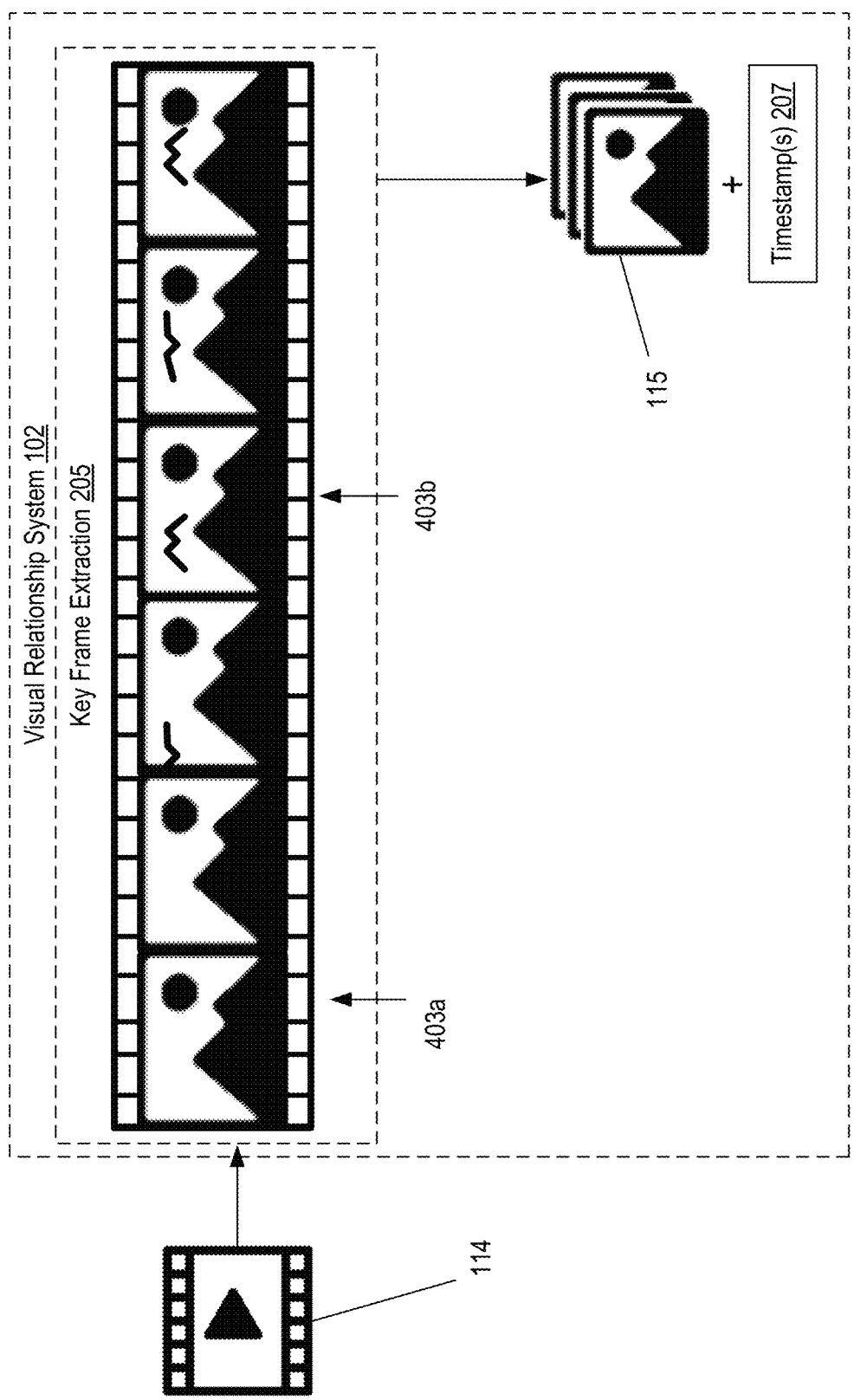
FIG. 4A depicts a block diagram of example key frame extraction by the visual relationship system of FIGS. 1 and/or 2.

As described with reference to FIG. 2A, the visual relationship model 108 can perform key frame extraction 205 on the video 114. FIG. 4A depicts a block diagram 401 of another example embodiment of the visual relationship system, where a video is analyzed using the visual relationship model to extract key frames from the video.

Visual relationship system 102 can obtain a video 114 as input and extract a set of key frames 115 representative of the video 114 as output, e.g., using histogram-based key frame extraction techniques, boundary coefficient-based key frame extraction techniques, or the like.

As depicted in FIG. 4A, a first frame 403a and a second frame 403b of video 114 are identified as representative of the video 114, e.g., include a difference between frames indicative of a significant change in what is depicted in the frame. Identifying frames that are indicative of a change can be determined, for example, using histogram-based key frame extraction techniques, boundary coefficient-based key frame extraction techniques, a customer-defined method, a combination thereof, or another similar technique for identifying key frames within a video. For example, between frames 403a and 403b, a bird 407 appear in the frames of the video, which may be of interest to a querying user.

The visual relationship system 102 may determine that one or both of frames 403a and 403b are significant and extract the particular frames as key frames 115, including respective timestamps 207 corresponding to an appearance of the key frames 115 in the video 114.

Figure 4B:
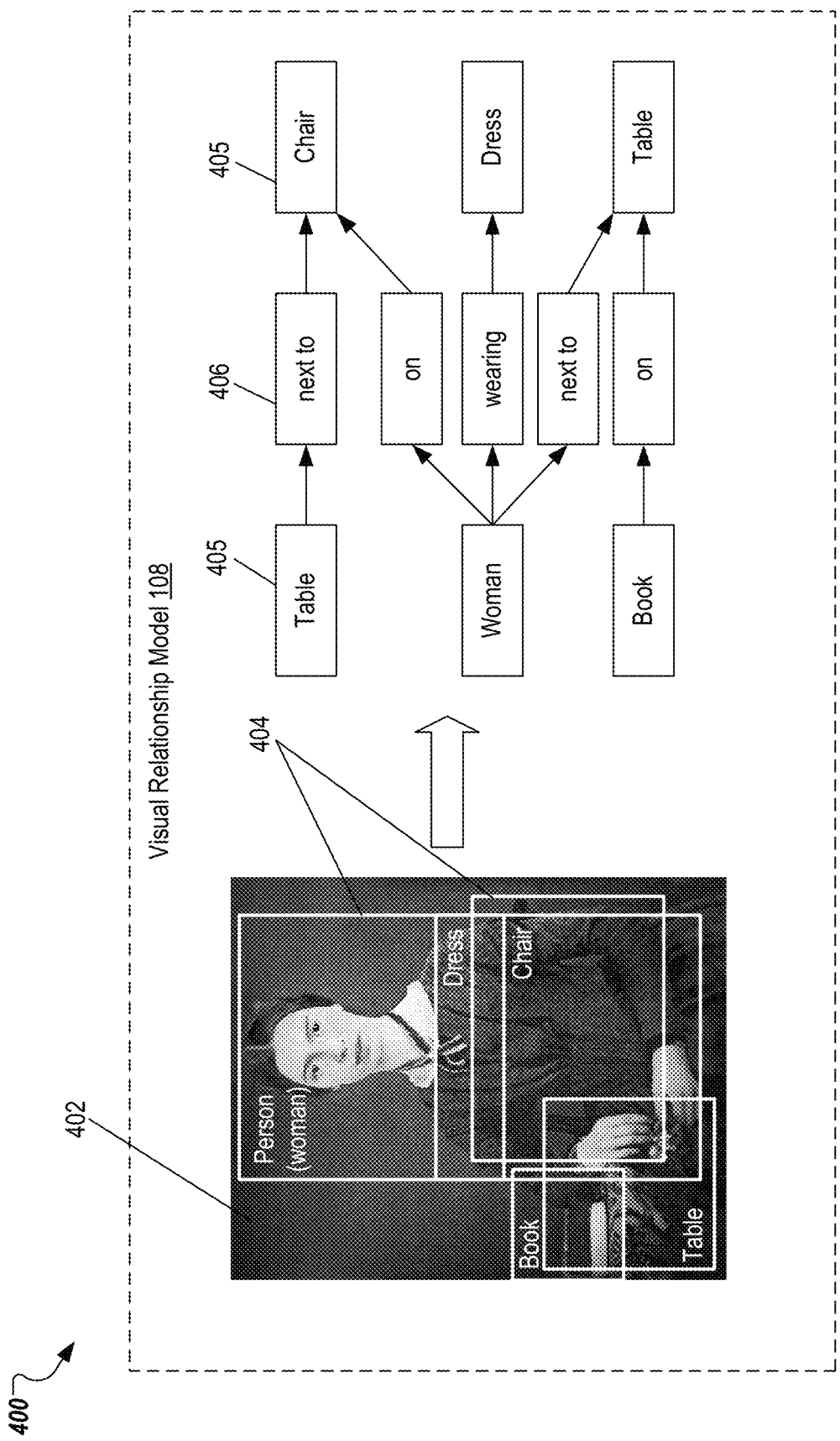
FIG. 4B depicts a block diagram of example objects and visual relationships determined by the visual relationship system.

As described with reference to FIG. 2A, the visual relationship model 108 can perform feature/object extraction 208 on key frames 115 of a video 114. FIG. 4B depicts a block diagram 400 of example objects and visual relationships in key frames that are determined/extracted by the visual relationship system. As depicted in FIG. 4B, a frame 402, which has been determined to be a key frame 115, depicts a woman sitting in a chair that is next to a table, where the table has a book on top of the table. The visual relationship model 108 can receive frame 402 and determine a set of bounding boxes 404, each bounding box encompassing an object or a portion of an object that appears within the key frame 402. For example, bounding boxes 404 for key frame 402 identify objects 405 including a person, e.g., a woman, a dress, a chair, a book, and a table within the key frame 402.

Each of the identified objects 405 encompassed by a bounding box and can be associated, e.g., linked, with one or more of the other identified objects 405 using a relationship feature e.g., from among a set of relationship features 406, where each of relationship features 406 describe a relationship between a pair of objects. Relationship features 406 can include natural language terms. Relationship features 406 for the key frame 402 can include, for example, "next to," "on," and "wearing." In one example, a visual relationship can be defined as "table next to chair" where "table" and "chair" are objects 405 and "next to" is a relationship feature 406 between the objects 405.

An example of a scene graph is depicted in FIG. 4B, showing multiple objects as nodes that are connected by relationship features as edges. An object, e.g., "woman", can be connected to multiple other objects, e.g., "chair," "dress,"

and "table", via respective relationship features 406, e.g., "on," "wearing," and "next to." The extracted objects 405 and relationship features 406 can be utilized by the visual relationship model 108 to generate a scene graph, e.g., scene graph 202, for the key frame 402.

In some implementations, text descriptive of the semantics of a key frame 115 and/or video 114 can be utilized instead of a scene graph 202 generated for a key frame 115 extracted from the video 114. In other words, text describing the objects and relationship features within a key frame 115 and/or the video 114 can be associated with the video 114. For example, an key frame 115 including a boy holding a ball can be associated, e.g., tagged or otherwise assigned to, terms including "boy", "holding", "ball", "boy holding a ball", and "boy holding ball". In some implementations, a neural network model can map an key frame into text descriptions, for example, using image captioning techniques. A semantic language search can be performed of the descriptive texts for each video 114 of the video database 116.

Example Process of the Visual Relationship System

Figure 5:
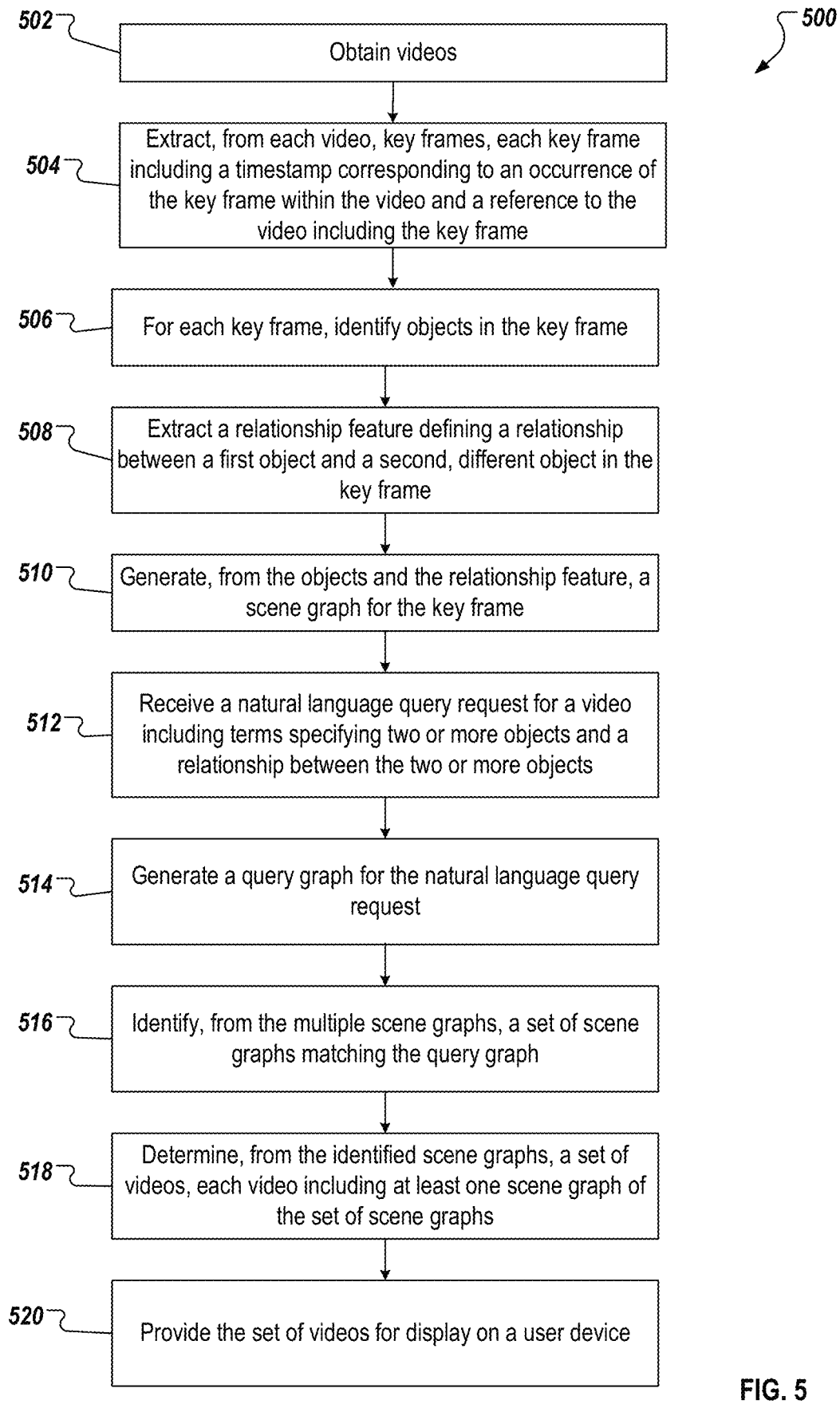
FIG. 5 is a flow diagram of an example process of the visual relationship system for processing videos and querying for videos.

FIG. 5 is a flow diagram of an example process 500 of the visual relationship system 102. Operations of process 500 are described below as being performed by the components of the system described and depicted in FIGS. 1-3, 4A, and 4B. Operations of the process 500 are described below for illustration purposes only. Operations of the process 500 can be performed by any appropriate device or system, e.g., any appropriate data processing apparatus. Operations of the process 500 can also be implemented as instructions stored on a non-transitory computer readable medium. Execution of the instructions cause one or more data processing apparatus to perform operations of the process 500.

Videos are obtained (502). Videos 114 from a video database 116 can be obtained by the visual relationship system 102. In some implementations, a video 114 is obtained by the visual relationship system 102 when the video is captured and/or saved into the video database 116. In some implementations, videos 114 from the video database 116 can be periodically obtained by the visual relationship system 102 for processing, e.g., when the user device 104 is connected to power, when a memory use of the user device 104 is below a threshold activity, etc.

In some implementations, videos 114 are stored locally on the user device 104, e.g., in the memory of a mobile phone. Videos 114 can additionally or alternatively be stored on a cloud-based server 103, which is in data communication with user device 104 via a network 105. Videos 114 can be, for example, documents including visual representations, e.g., videos captured by a camera of the user device 104. In general, documents can be processed by the visual relationship system 102 including, for example, documents in MPEG Layer-4 Audio (MP4), QuickTime Movie (MOV), Video Interleave (AVI), or another format for visual-based documents.

In some implementations, the operations described below with reference to steps 504 through 508 can be performed on each video of a repository of videos in a video database 116. Alternatively, the operations described below with reference to steps 504 through 508 can be performed on each video in a subset of videos taken from the repository of videos. As described above with reference to FIG. 2A, each video 114 can be received by the visual relationship model 108 as input and a scene graph 202 can be generated for a key frame 115 representative of the video 114.

From each video, key frames are extracted, each key frame including a timestamp corresponding to an occurrence of the key frame within the video and a reference to the video including the key frame (504), as described with reference to FIGS. 2A and 4A.

From each video and for each key frame, objects are identified in the key frame (506), as described with reference to FIGS. 2A and 4B. Visual relationship model 108 can perform feature/object extraction 208 on the key frame 115. Object extraction can include applying bounding boxes 210 to the key frame 115, where each bounding box 210 encompasses an object or encompasses a portion of an object appearing within the key frame. As depicted in FIG. 4B, bounding boxes 404 can each define an object 405, e.g., table, woman, book, etc., that appear in the frame 402. Object detection models, e.g., mask R-CNN, YOLO, single shot detector (SSD), can be utilized to identify objects in the image. In some embodiments, identifying objects in the key frame 115 can be performed using a machine-learned model architecture that can perform object detection and scene graph prediction/generation in a concurrent process. For example, a feature pyramid network (FPN) can be utilized to aggregate multi-scale information that is derived from a ResNet50 backbone that is applied to an input key frame 115.

Referring back to FIG. 5, from each video and for each key frame, a relationship feature is extracted defining a relationship between a first object and a second, different object in the key frame (508), as described with reference to FIGS. 2A and 4B. A relationship feature can be extracted by the visual relationship model 108, e.g., using deep neural networks, and defines a relationship between at least two objects that appear within the key frame. Extraction of relationship features from the key frame can be built into the visual relationship model as a part of an end-to-end output. The relationship feature can include one or more terms defining the relationship between a first object and a second object. As depicted in FIG. 4B, a relationship feature 406 can include a term or set of terms, for example, "next to" and "wearing" where the terms define how a first object relates to a second object.

In some implementations, the visual relationship model 108 is a machine-learned model implemented as a single pass model, which can predict a scene graph for an input video 114 and/or input key frame 115 in a single pass.

Referring back to FIG. 5, a scene graph is generated from the objects and the relationship feature (510), as described with reference to FIG. 2A. A scene graph, e.g., scene graph 202 depicted in FIG. 2A, can be generated by the visual relationship system 102, where each object is defined as a node 204 and each relationship feature as an edge 206 connecting between two nodes 204 in the scene graph 202. In some implementations, a first node 204 can be connected to a second node via a first edge 206 and connected to a third node via a second edge 206. The scene graph 202 can include a timestamp, e.g., timestamp 207 corresponding to an occurrence of the key frame 115 represented by the scene graph 202 within a respective video 114 from which it is extracted.

The generated scene graph 202 is stored in a scene graph database 118, e.g., locally on the user device 104 and/or on a cloud-based server 103 in data communication with the user device 104 via network 105. Each generated scene graph 202 can include a reference to the particular key frame 115 from which is it generated, e.g., an identifier referencing the key frame 115. Additionally, each generated scene graph 202 can include a reference to the particular video 114 from which the key frame 115 was extracted, e.g., an identifier referencing the video 114 including a timestamp 207 and/or a storage location of the video 114 in video database 116. The scene graph database 118 can be indexed to generate a scene graph index 216, which may be utilized for searching the scene graph database 118 for a particular set of scene graphs 202.

Referring back to FIG. 5, a natural language query request is received for a video including terms specifying two or more objects and a relationship between the two or more objects (512), as described with reference to FIGS. 1 and 3. A natural language query request, e.g., query 120, can be a voice query provided by a user of a user device 104, for example, through an application interface 112 of an application 110 and/or through a digital assistant on the user device 104. The natural language query request can include a set of terms descriptive of one or more objects and one or more relationships between the objects in a video that the user is interested in viewing. For example, the natural language query request can be "I want to find a woman sitting on a chair," where the objects are "woman" and "chair" and the relationship between the objects is "sitting on." In another example, a natural language query request can be "Find the video of me hiking on Mount St. Helens," where the objects are "me [the user]" and "Mount St. Helens," and the relationship between the objects is "hiking on."

In some implementations, a speech-to-text converter, e.g., speech-to-text converter 106, receives a voice query and converts it into a text-based query that can be provided to the visual relationship model 108. Speech-to-text converter 106 can be a part of the visual relationship system 102, or can be a function of a digital assistant or another application 110 located on the user device 104.

Visual relationship system 102 can receive the textual query from a speech-to-text converter 106, e.g., query 302, and perform feature/object extraction, e.g., feature/object extraction 304, to extract objects and relationship features, e.g., objects 306 and relationship features 308 included in the query.

Referring now to FIG. 5, a query graph is generated for the natural language query request (514), as described with reference to FIG. 3. Query graph generation, e.g., query graph generation 310, can be performed by the visual relationship system 102 using the extracted objects and relationship features from the user-provided query. A query graph, e.g., query graph 312, can be generated that includes a graph-based representation of the query 302, in which each object 306 is represented by a node 314 and each relationship feature 308 is represented by an edge 316 connecting a first node to a second node.

Referring back to FIG. 5, a set of scene graphs matching the query graph are identified from the multiple scene graphs (516), as described with reference to FIGS. 1 and 3. Scene graph matching, e.g., scene graph matching 318, can be performed by the visual relationship system 102 in which the query graph 312 is compared to the scene graphs 202 in the scene graph database 118. A set of scene graphs from among the scene graphs 202 that match the query graph 312 are identified, for example, by searching a scene graph index 216 for scene graphs among the scene graphs 202 that match, e.g., an exact match, a proximate/fuzzy match, the query graphs 312. In some implementations, based on the matching, each scene graph 202 in the scene graph database 118 can be assigned a confidence score with respect to the query graph 312, e.g., a trueness of the match, and only those scene graphs with a confidence score that satisfies, e.g., meets or exceeds, a threshold confidence score are included in the set of scene graphs.

Referring now to FIG. 5, a set of videos are determined from the identified scene graphs, each video including at least one scene graph of the set of scene graphs (518), as described with reference to FIGS. 1 and 3. Each video 114 of the set of videos 114 includes at least one key frame corresponding to a scene graph of the identified scene graphs 202.

The set of videos are provided for display on a user device (520), as described with reference to FIG. 1. A set of videos corresponding to the set of scene graphs, e.g., videos 114 including key frames 115 corresponding to scene graphs 202, can be identified from the video database 116. In some implementations, the set of videos can be identified from a scene graph index, where each identified scene graph includes a reference to a video that includes a key frame from which the identified scene graph is generated. The system can store multiple scene graphs and the respective timestamps for each scene graph of the multiple scene graphs generated for a particular video. Each scene graph of the set of scene graphs can include a reference to a particular key frame 115 from which the scene graph was generated and/or a particular video 114 from which the key frame 115 was extracted, e.g., a reference to a storage location, a unique identifier, or the like. The set of videos can be identified in the video database 116 and provided for display by the visual relationship system 102 to an application 110, e.g., a video gallery application, on the user device 104.

In some implementations, the set of scene graphs matching the query graph can be filtered such that one scene graph is selected for each video in the set of videos identified and provided for display on the user device 104. In other words, if the set of scene graphs matching the query graph includes multiple scene graphs generated from key frames extracted from a same video 114, the system can filter the set of scene graphs to include one scene graph representative of each video 114.

A set of videos each including at least one key frame corresponding to the set of scene graphs, e.g., videos 114 including key frames 115 corresponding to scene graphs 202, can be displayed in an application interface of an application, e.g., application interface 112 of application 110, on the user device 104. In some implementations, the set of videos can be presented for display with respect to a ranking for each video in the set of videos, as described above with reference to FIG. 3. In one example, a first video including a key frame 115 corresponding to a scene graph having a higher confidence score can be presented in a more prominent position in the application interface 112, e.g., at the top of the displayed results, than a second video including a key frame corresponding to a scene graph having a lower confidence score.

Figure 6:
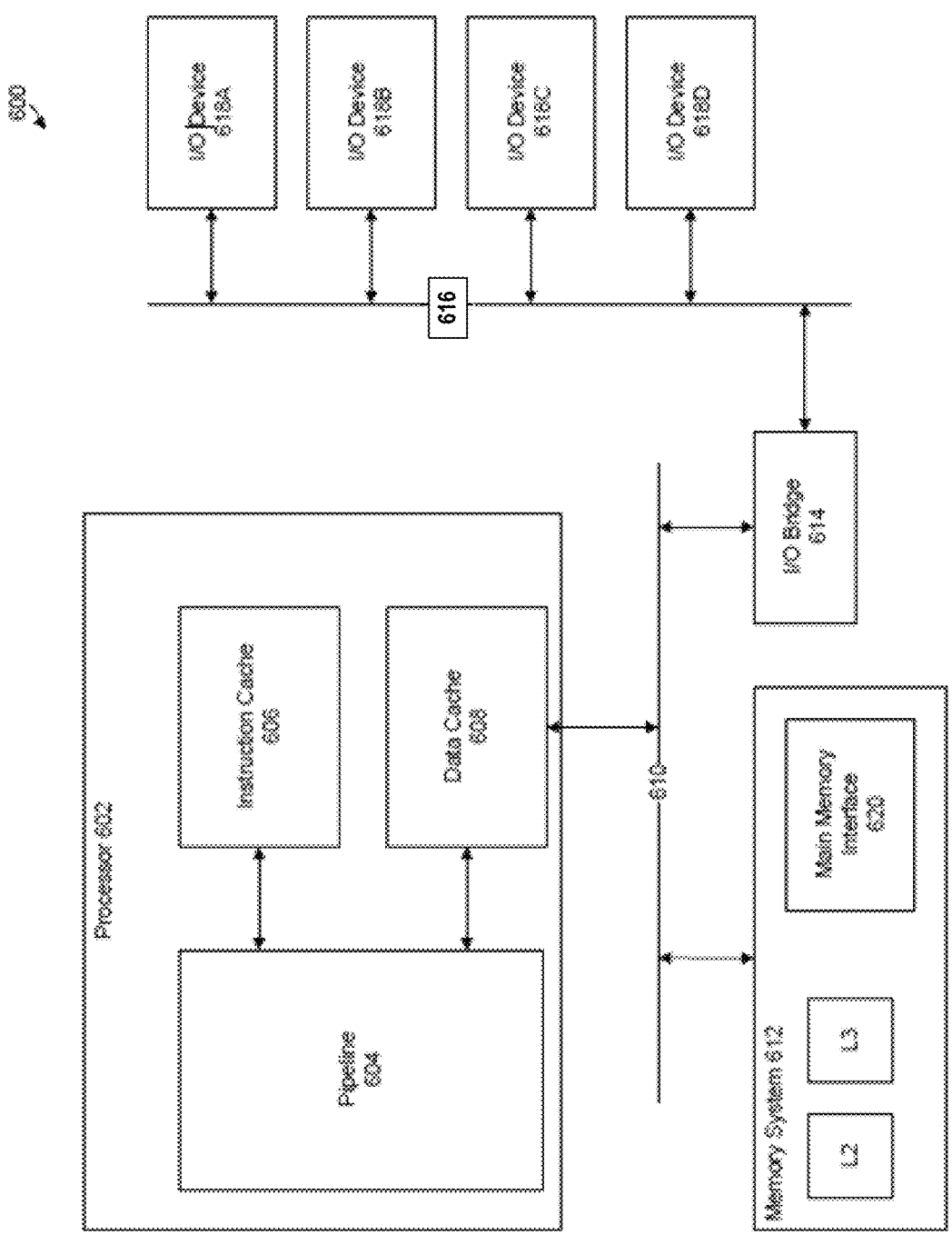
FIG. 6 shows an example of a computing system in which the microprocessor architecture disclosed herein may be implemented.

FIG. 6 shows an example of a computing system in which the microprocessor architecture disclosed herein may be implemented. The computing system 600 includes at least one processor 602, which could be a single central processing unit (CPU) or an arrangement of multiple processor cores of a multi-core architecture. In the depicted example, the processor 602 includes a pipeline 604, an instruction cache 606, and a data cache 608 (and other circuitry, not shown). The processor 602 is connected to a processor bus 610, which enables communication with an external memory system 612 and an input/output (I/O) bridge 614. The I/O bridge 614 enables communication over an I/O bus 616, with various different I/O devices 618A-618D (e.g., disk controller, network interface, display adapter, and/or user input devices such as a keyboard or mouse).

The external memory system 612 is part of a hierarchical memory system that includes multi-level caches, including the first level (L1) instruction cache 606 and data cache 608, and any number of higher level (L2, L3, . . . ) caches within the external memory system 612. Other circuitry (not shown) in the processor 602 supporting the caches 606 and 608 includes a translation lookaside buffer (TLB), various other circuitry for handling a miss in the TLB or the caches 606 and 608. For example, the TLB is used to translate an address of an instruction being fetched or data being referenced from a virtual address to a physical address, and to determine whether a copy of that address is in the instruction cache 606 or data cache 608, respectively. If so, that instruction or data can be obtained from the L1 cache. If not, that miss is handled by miss circuitry so that it may be executed from the external memory system 612. It is appreciated that the division between which level caches are within the processor 602 and which are in the external memory system 612 can differ in various examples. For example, an L1 cache and an L2 cache may both be internal and an L3 (and higher) cache could be external. The external memory system 612 also includes a main memory interface 620, which is connected to any number of memory modules (not shown) serving as main memory (e.g., Dynamic Random Access Memory modules).

Figure 7:
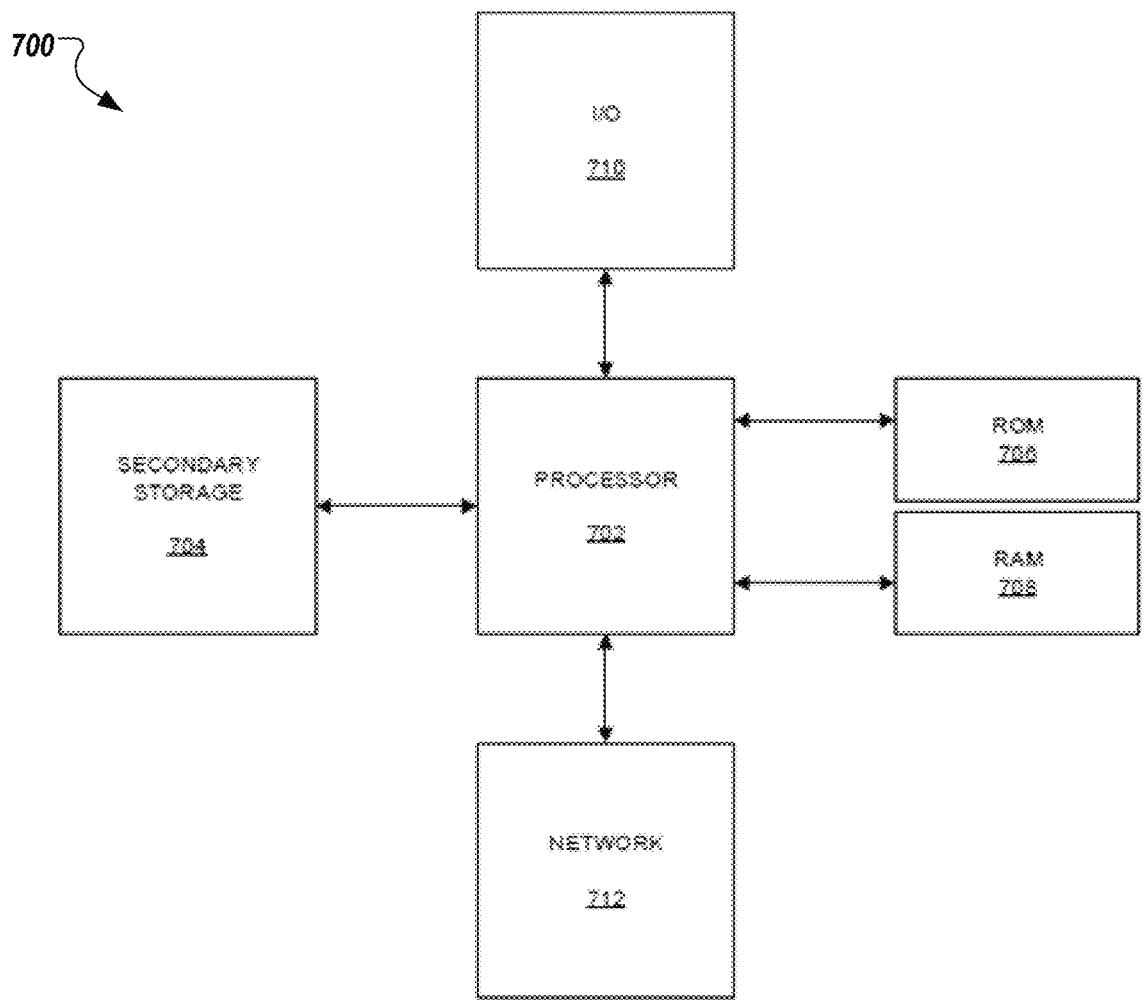
FIG. 7 illustrates a schematic diagram of a general-purpose network component or computer system.

FIG. 7 illustrates a schematic diagram of a general-purpose network component or computer system. The general-purpose network component or computer system includes a processor 702 (which may be referred to as a central processor unit or CPU)

that is in communication with memory devices including secondary storage 704, and memory, such as ROM 706 and RAM 708, input/output (I/O) devices 710, and a network 712, such as the Internet or any other well-known type of network, that may include network connectively devices, such as a network interface. Although illustrated as a single processor, the processor 702 is not so limited and may comprise multiple processors. The processor 702 may be implemented as one or more CPU chips, cores (e.g., a multi-core processor), FPGAs, ASICs, and/or DSPs, and/or may be part of one or more ASICs. The processor 702 may be configured to implement any of the schemes described herein. The processor 702 may be implemented using hardware, software, or both.

The secondary storage 704 is typically comprised of one or more disk drives or tape drives and is used for non-volatile storage of data and as an over-flow data storage device if the RAM 708 is not large enough to hold all working data. The secondary storage 704 may be used to store programs that are loaded into the RAM 708 when such programs are selected for execution. The ROM 706 is used to store instructions and perhaps data that are read during program execution. The ROM 706 is a non-volatile memory device that typically has a small memory capacity relative to the larger memory capacity of the secondary storage 704. The RAM 708 is used to store volatile data and perhaps to store instructions. Access to both the ROM 706 and the RAM 708 is typically faster than to the secondary storage 704. At least one of the secondary storage 704 or RAM 708 may be configured to store routing tables, forwarding tables, or other tables or information disclosed herein.

It is understood that by programming and/or loading executable instructions onto the node 700, at least one of the processor 720 or the memory 722 are changed, transforming the node 700 in part into a particular machine or apparatus, e.g., a router, having the novel functionality taught by the present disclosure. Similarly, it is understood that by programming and/or loading executable instructions onto the node 700, at least one of the processor 702, the ROM 706, and the RAM 708 are changed, transforming the node 700 in part into a particular machine or apparatus, e.g., a router, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design.

Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The technology described herein can be implemented using hardware, firmware, software, or a combination of these. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this disclosure, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method, comprising:
generating, by a data processing apparatus, a plurality of scene graphs for a plurality of videos, wherein generating the plurality of scene graphs includes:
extracting, by the data processing apparatus and from each video of the plurality of videos, a plurality of key frames, each key frame including a timestamp corresponding to an occurrence of the key frame within the video and a reference to the video including the key frame; and
generating, by the data processing apparatus and for each key frame in the plurality of key frames, a scene graph for the key frame, including:
identifying, by a machine-learned model, a plurality of objects in the key frame;
extracting, by the machine-learned model, a relationship feature defining a relationship between a first object and a second, different object of the plurality of objects in the key frame; and
generating, by the machine-learned model and from the first object, the second object, and the relationship feature, the scene graph for the key frame that includes a set of nodes and a set of edges that interconnect a subset of nodes in the set of nodes, wherein the first object is represented by a first node from the set of nodes, the second object is represented by a second node from the set of nodes, and the relationship feature is an edge connecting the first node to the second node;

receiving, by the data processing apparatus, a natural language query request for a video in the plurality of videos, wherein the natural language query request comprises a plurality of terms specifying two or more particular objects and a relationship between the two or more particular objects;

generating, by the data processing apparatus, a query graph for the natural language query request, the query graph representing objects and relationship features extracted from the natural language query request as nodes and edges between nodes;

matching the query graph and to the scene graph of each key frame to identify, by the data processing apparatus and from the plurality of scene graphs, a set of scene graphs of the plurality of scene graphs matching the query graph; and generating, by the data processing apparatus and from the identified set of scene graphs, a set of videos of the plurality of videos, each video including at least one scene graph of the set of scene graphs.

2. The method of claim 1, further comprising:
providing, by the data processing apparatus and for display on a client device, a set of key frames corresponding to the set of scene graphs of the plurality of scene graphs matching the query graph.

3. The method of claim 1, further comprising ranking the set of videos of the plurality of videos, the ranking comprising:
determining, for each video of the set of videos, a relevance score based on a number of key frames of the set of key frames that include the reference to the video; and
ranking the set of videos according to respective relevance scores.

4. The method of claim 1, wherein the natural language query request is for a key frame within a particular video and specifies the two or more particular objects and the relationship between the two or more particular objects in the key frame.

5. The method of claim 1, further comprising:
generating, by the data processing apparatus and from the plurality of scene graphs, a scene graph index,
wherein identifying the set of scene graphs of the plurality of scene graphs matching the query graph comprises searching the scene graph index.

6. The method of claim 1, wherein identifying the plurality of objects in the key frame comprises:
extracting, by the machine-learned model, a set of bounding boxes, each bounding box encompassing an object in the key frame; and
identifying, by the machine-learned model, the object within the bounding box.

7. One or more non-transitory computer-readable media coupled to one or more processors and having instructions stored thereon which, when executed by the one or more processors, cause the one or more processors to perform operations comprising:
generating a plurality of scene graphs for a plurality of videos, wherein generating the plurality of scene graphs includes:
extracting, from each video of the plurality of videos, a plurality of key frames, each key frame including a timestamp corresponding to an occurrence of the key frame within the video and a reference to the video including the key frame; and
generating, for each key frame in the plurality of key frames, a scene graph for the key frame, including:
identifying, by a machine-learned model, a plurality of objects in the key frame;
extracting, by the machine-learned model, a relationship feature defining a relationship between a first object and a second, different object of the plurality of objects in the key frame; and
generating, by the machine-learned model and from the first object, the second object, and the relationship feature, the scene graph for the key frame that includes a set of nodes and a set of edges that interconnect a subset of nodes in the set of nodes, wherein the first object is represented by a first node from the set of nodes, the second object is represented by a second node from the set of nodes, and the relationship feature is an edge connecting the first node to the second node;

receiving a natural language query request for a video in the plurality of videos, wherein the natural language query request comprises a plurality of terms specifying two or more particular objects and a relationship between the two or more particular objects;

generating a query graph for the natural language query request, the query graph representing objects and relationship features extracted from the natural language query request as nodes and edges between nodes;

matching the query graph and to the scene graph of each key frame to identify, from the plurality of scene graphs, a set of scene graphs of the plurality of scene graphs matching the query graph; and generating, from the identified set of scene graphs, a set of videos of the plurality of videos, each video including at least one scene graph of the set of scene graphs.

8. The computer-readable media of claim 7, further comprising:
providing, for display on a client device, a set of key frames corresponding to the set of scene graphs of the plurality of scene graphs matching the query graph.

9. The computer-readable media of claim 7, further comprising ranking the set of videos of the plurality of videos, the ranking comprising:
determining, for each video of the set of videos, a relevance score based on a number of key frames of the set of key frames that include the reference to the video; and
ranking the set of videos according to respective relevance scores.

10. The computer-readable media of claim 7, wherein the natural language query request is for a key frame within a particular video and specifies the two or more particular objects and the relationship between the two or more particular objects in the key frame.

11. The computer-readable media of claim 7, further comprising:
generating, from the plurality of scene graphs, a scene graph index,
wherein identifying the set of scene graphs of the plurality of scene graphs matching the query graph comprises searching the scene graph index.

12. The computer-readable media of claim 7, wherein identifying the plurality of objects in the key frame comprises:
  extracting, by the machine-learned model, a set of bounding boxes, each bounding box encompassing an object in the key frame; and
  identifying, by the machine-learned model, the object within the bounding box.

13. A system, comprising:
  one or more processors; and
  a non-transitory computer-readable media device coupled to the one or more processors and having instructions stored thereon which, when executed by the one or more processors, cause the one or more processors to perform operations comprising:
    generating a plurality of scene graphs for a plurality of videos, wherein generating the plurality of scene graphs includes:
      extracting, from each video of the plurality of videos, a plurality of key frames, each key frame including a timestamp corresponding to an occurrence of the key frame within the video and a reference to the video including the key frame; and
      generating, for each key frame in the plurality of key frames, a scene graph for the key frame, including:
        identifying, by a machine-learned model, a plurality of objects in the key frame;
        extracting, by the machine-learned model, a relationship feature defining a relationship between a first object and a second, different object of the plurality of objects in the key frame; and
        generating, by the machine-learned model and from the first object, the second object, and the relationship feature, the scene graph for the key frame that includes a set of nodes and a set of edges that interconnect a subset of nodes in the set of nodes, wherein the first object is represented by a first node from the set of nodes, the second object is represented by a second node from the set of nodes, and the relationship feature is an edge connecting the first node to the second node;
    receiving a natural language query request for a video in the plurality of videos, wherein the natural language query request comprises a plurality of terms specifying two or more particular objects and a relationship between the two or more particular objects;
    generating a query graph for the natural language query request, the query graph representing objects and relationship features extracted from the natural language query request as nodes and edges between nodes;
    matching the query graph and to the scene graph of each key frame to identify, from the plurality of scene graphs, a set of scene graphs of the plurality of scene graphs matching the query graph; and
    generating, from the identified set of scene graphs, a set of videos of the plurality of videos, each video including at least one scene graph of the set of scene graphs.

14. The system of claim 13, further comprising:
  providing, for display on a client device, a set of key frames corresponding to the set of scene graphs of the plurality of scene graphs matching the query graph.

15. The system of claim 13, further comprising ranking the set of videos of the plurality of videos, the ranking comprising:
  determining, for each video of the set of videos, a relevance score based on a number of key frames of the set of key frames that include the reference to the video; and
  ranking the set of videos according to respective relevance scores.

16. The system of claim 13, wherein the natural language query request is for a key frame within a particular video and specifies the two or more particular objects and the relationship between the two or more particular objects in the key frame.

17. The system of claim 13, further comprising:
  generating, from the plurality of scene graphs, a scene graph index,
  wherein identifying the set of scene graphs of the plurality of scene graphs matching the query graph comprises searching the scene graph index.

18. The system of claim 13, wherein identifying the plurality of objects in the key frame comprises:
  extracting, by the machine-learned model, a set of bounding boxes, each bounding box encompassing an object in the key frame; and
  identifying, by the machine-learned model, the object within the bounding box.

* * * * *